March 12, 1963 R. A. COOPER 3,081,422
OSCILLATOR CONTROLLED SERVOSYSTEM
Filed May 8, 1959 2 Sheets-Sheet 1

INVENTOR:
ROLLIN A. COOPER,

BY Orville R. Seidner

Agent.

March 12, 1963 R. A. COOPER 3,081,422
OSCILLATOR CONTROLLED SERVOSYSTEM
Filed May 8, 1959 2 Sheets-Sheet 2

INVENTOR:
ROLLIN A. COOPER,
BY
Orville R. Leidrey
Agent.

United States Patent Office 3,081,422
Patented Mar. 12, 1963

3,081,422
OSCILLATOR CONTROLLED SERVOSYSTEM
Rollin A. Cooper, Los Angeles, Calif., assignor to The Garrett Corporation, Los Angeles, Calif., a corporation of California
Filed May 8, 1959, Ser. No. 811,920
11 Claims. (Cl. 318—28)

This invention relates to instruments in general and particularly to either instrument circuits for measuring the electrical characteristic values of passive elements such as capacitors, inductors, resistors, and the like, or to instrumentation circuits.

Instruments in the prior art are known for measuring the values of passive and non-linear circuit elements. These instruments are usually characterized by a bridge circuit in which a voltage is applied across two terminals of a bridge comprising for example, two impedance elements of fixed known values, an element of variable value having a dial or other means for reading its value, and the element of unknown value which is to be determined. A meter or other means is usually connected across the other two terminals of the bridge and the variable impedance element varied until the meter or other indicating means gives a reading of zero or maximum, as the case may be. Three terms of a simple proportion then being known, the value of the unknown is easily determined.

It will be noted that one characteristic of such prior art devices is that a voltage is applied across all impedance elements including the unknown impedance element when its value is determined, hence a current will flow in the element. Ordinarily, the small current flowing is of no consequence, since the usual passive or non-linear element is utilized when current is flowing in the network or circuit of which it is a part.

However, there are occasions when it is essential that the exact value of that elment be known for a condition where no current is flowing, as for example, to know the capacitance presented by a capacitor to an electron tube biased to cutoff, and such capacitance value is critical. Since the values, as between a state of current flow and that of no current flow, can vary within circuit elements, it is seen that the measuring instruments of the prior art cannot be relied on to give a correct measurement at the point desired.

According to the present invention, the element whose value is to be determined is connected in a bridge to which a voltage may be applied. However, bridge balance is obtained only at a point at which the voltage across the element has been reduced to zero. Hence the reading of the value on the known element at the time of zero voltage application gives a measure of the value of the unknown element with zero voltage applied thereto.

For example, an electron tube is employed in a conventional oscillator or tuned amplifier circuit including bridge circuit elements coupled to the input and output thereof, so that a state of substantially zero oscillation will exist when the bridge is balanced. Effectively, the bridge constitutes a voltage divider such that both voltage input terminals thereof are at the zero reference, or ground potential when the bridge is balanced.

It is therefore an object of the invention to provide an electronic circuit including an excitable electron device having input and output electrodes, in which unknown and known impedance elements are coupled with the electronic device in such manner that the voltage across the elements is reduced to zero when the electrical characteristic values of the elements are so proportioned that oscillation in or the amplification of the circuit has been reduced to zero, means being provided to indicate the value of the unknown element as a measure of the value of a known element.

It is a further object of the invention to provide such an electronic circuit as aforesaid with a known variable impedance element, whereby the value of the variable impedance element may be varied so as to reduce the oscillation or amplification of the circuit to zero and hence reduce the voltage applied across the elements to zero. In such a circuit, the value of the unknown impedance may then be read directly off the dial on the known variable impedance. It is a still further object to provide such a circuit with a servo motor which will automatically vary the known variable impedance until the voltage applied across the elements has been reduced substantially to zero.

Another adaptation of the circuit is that in which the unknown impedance element is comprised of a temperature sensing resistor. In such resistors, of course, it is known that the resistance varies as a function of the temperature which may vary by reason of local currents flowing in them. Hence, by utilizing a known variable resistor whose resistance is varied by a servo motor as aforesaid, it is readily seen that an instrument may be devised in which the resistance value of an unknown resistor, and hence the temperature of the medium surrounding that resistor, may be determined by an indicator means coupled to the servo motor when no temperature upsetting current is flowing in the temperature sensor. It is an object of the invention to provide a temperature indicating means as aforesaid.

Other and further objects will be apaprent to those skilled in the art upon review of the specification, in connection with the drawings wherein preferred embodiments are shown and described. In the drawings.

Figure 1:
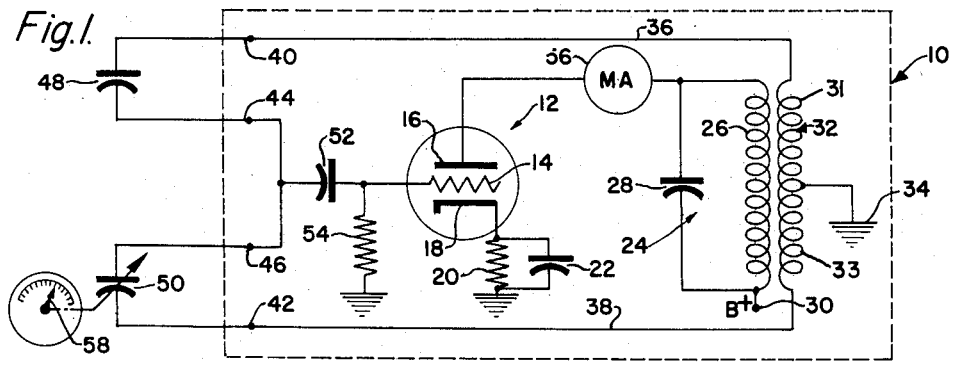
FIG. 1 is a circuit diagram embodying the present invention arranged for measuring capacitance by manual means.

Referring to FIG. 1, the electronic circuit 10 is shown as including an excitable electron device, illustrated as an electron tube 12 having an input grid 14 and an output anode 16 together with a cathode 18, the cathode 18 having the usual bias resistor 20 and by-pass condenser 22 connecting the cathode to ground. The output anode 16 of the tube 12 is coupled with the parallel resonant circuit 24 comprising the inductance 26 and capacitor 28. Anode supply voltage for the electron tube 12 is supplied through the inductance 26 by a connection 30 to the B+ source. An inductance 32 is mutually coupled with the inductance 26, the inductance 32 having a center tap which is grounded as shown at 34, the center tap dividing the inductance 32 into the two equal halves 31 and 33. The end terminals of inductance halves 31 and 33 are coupled by means of conductors 36 and 38 to the terminals 40 and 42 respectively, these latter terminals comprising, together with terminals 44 and 46, means for connecting an unknown capacitor 48 and a known capacitor 50 to the input grid 14 of a tube 12 through the coupling capacitor 52.

Essentially, the voltage feedback through the conductor 38 is 180° out of phase from that in conductor 36 with respect to ground.

The grid leak resistor 54 connected between the grid and ground completes the circuit. There is also shown a milliammeter 56 connected in the anode circuit of the tube 12 and a dial pointer 58 mechanically coupled with the variable condenser 50. The circuit as described above represents a conventional oscillator when the circuit is unbalanced because of unequal voltages appearing across capacitors 48 and 50 of unequal capacitance. However, when the two capacitors 48 and 50 are of equal value, terminals 44 and 46 are effectively at ground or zero signal potential and no oscillation takes place. In other words, there is an effective condition of 100% degeneration. Thus the capacitance of the unknown capacitor 48 may be measured by adjusting the capacitance of capacitor 50 until oscillation or signal conduction by the tube stops, which may be readily determined by observing the movement of the indicating needle on the milliammeter 56.

It will be remembered that the amount of anode direct current in an oscillating circuit is a function of the degree of oscillation of the oscillator tube, due to the self bias characteristics of oscillator circuits. In the instant case it is apparent that self bias is obtained by a combination of grid-leak and cathode resistor methods. Thus, when the tube 12 is oscillating the anode current indicated by the meter 56 is the usual nominal value, 3 milliamperes for example, as governed by tube characteristics, supply voltage, circuit parameters, etc.

However, when the oscillation voltage applied to the grid is reduced by degeneration the anode current will rise and attain some maximum value, for example 10 milliamperes when oscillation ceases completely upon 100% degeneration, as will be apparent to those versed in the art. The minimum and maximum values quoted for anode current are merely exemplary.

This known characteristic of such circuits is uniquely employed in the instant application where a combination of regenerative and degenerative circuits are coupled in voltage divider fashion to the control grid of the tube.

It is thus seen that the inductance halves 31 and 33 and capacitors 48 and 50 form a voltage divider, and, when the two capacitors are of equal capacitance, the voltage impressed on the control grid equals that of the inductance center tap which is ground. Thus when oscillation is stopped, as indicated by a maximum reading on the meter 56, the capacitance of capacitor 50, and hence of the unknown capacitor 48, may be read on the dial 58.

It should be noted that if the initial capacity of the reference capacitor 50 (relative to that of the unknown capacitor 48) is such that the degenerative voltage applied to the grid 14 is less than the regenerative voltage, the circuit oscillates until the operator rotates the capacitor 50 to the position such that its capacity is equal to that of the unknown capacitor 48. A further important factor of degeneration characteristics should be remembered, to wit that further rotation of the capacitor 50 beyond the point of equality with capacitor 48 will have no further effect on the anode current since degeneration beyond 100% does not occur. This characteristic is inherent in oscillator circuits, as will be appreciated by those skilled in the electronic art.

It will be apparent now to those skilled in the art that the composite feedback signal at grid 14 will be either regenerative or degenerative, depending on the relative values of the capacitors 48 and 50. If, for example, the feedback is regenerative when the value of capacitor 48 is large relative to that of capacitor 50, then the feedback is degenerative when the relative values of the capacitors are reversed.

Under actual operating conditions neither of these situations will cause more than little concern since the operator would acquire experience very quickly. He would normally set the capacitor 50 to minimum, or near zero value, before starting his test procedure, if the circuit arrangement of polarities was such as to cause it to oscillate with these relative capacitor values. If the polarities were otherwise, he would normally set the capacitor at or near maximum and proceed with the test by reducing its capacitance.

Further, by the simple expedient of providing a simple DPDT reversing switch between the connections of conductors 36 and 38 to the terminals 40 and 42 the operator would be enabled to select the polarities and hence begin his test procedure from either minimum or maximum settings of the capacitor 50 at will.

Figure 4:
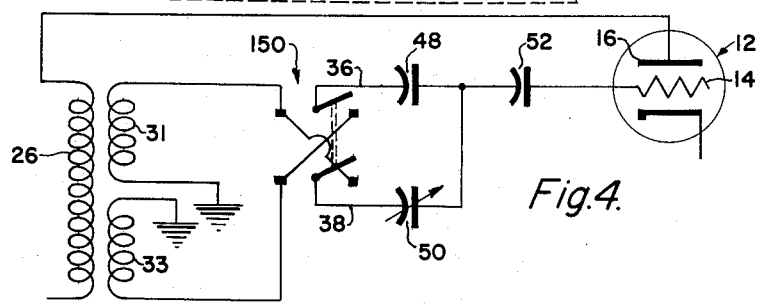
FIG. 4 is a simplified circuit diagram of a portion of FIG. 1, showing a switching circuit therefor.

Such a switch arrangement is shown in FIG. 4 where the circuit elements of FIG. 1 have been rearranged to convey a better understanding of the circuit. For purposes of explanation it will be assumed that the circuit oscillates with the switch 150 thrown to the left and the value of the unknown capacitor 48 is greater than that of the capacitor 50 at its minimum value set position. Conversely, of course, the circuit will be completely degenerated and will not oscillate with the switch 150 thrown to the right and with the same relative values of the capacitors.

Returning now to the first assumed set of conditions, let us further assume that the operator has set the capacitor 50 at minimum value and has thrown the switch 150 to the left whereby the capacitor 48 will be coupled to the inductance half 31 through conductor 36 and capacitor 50 to inductance half 33 through conductor 38. The circuit will oscillate since the voltage applied to the grid 14 by the coil 31 and capacitor 48 is more regenerative than the voltage supplied by coil 33 and capacitor 50 is degenerative.

As the operator increases the capacity of the capacitor 50, the degenerative voltage is increased and the anode current indicated by meter 56 increases. When capacitor 50 equals capacitor 48 in capacitance the degeneration is 100% and the meter reading is a maximum. Further advance of capacitor 50 will have no effect on anode current, hence no change of meter reading.

Now let us assume that the operator sets the capacitor 50 at maximum and throws the switch 150 to the right in which case the capacitor 50 is coupled to the coil 31 through conductor 38 and capacitor 48 to the coil 33 through conductor 36. Here again the circuit will oscillate since the regenerative voltage applied to the grid is greater than the degenerative voltage. In this case the decrease of the capacity of the capacitor 50 by the operator causes a decrease of the regenerative voltage until such point is reached where the two voltages are equal and the circuit is 100% degenerated.

Figure 2:
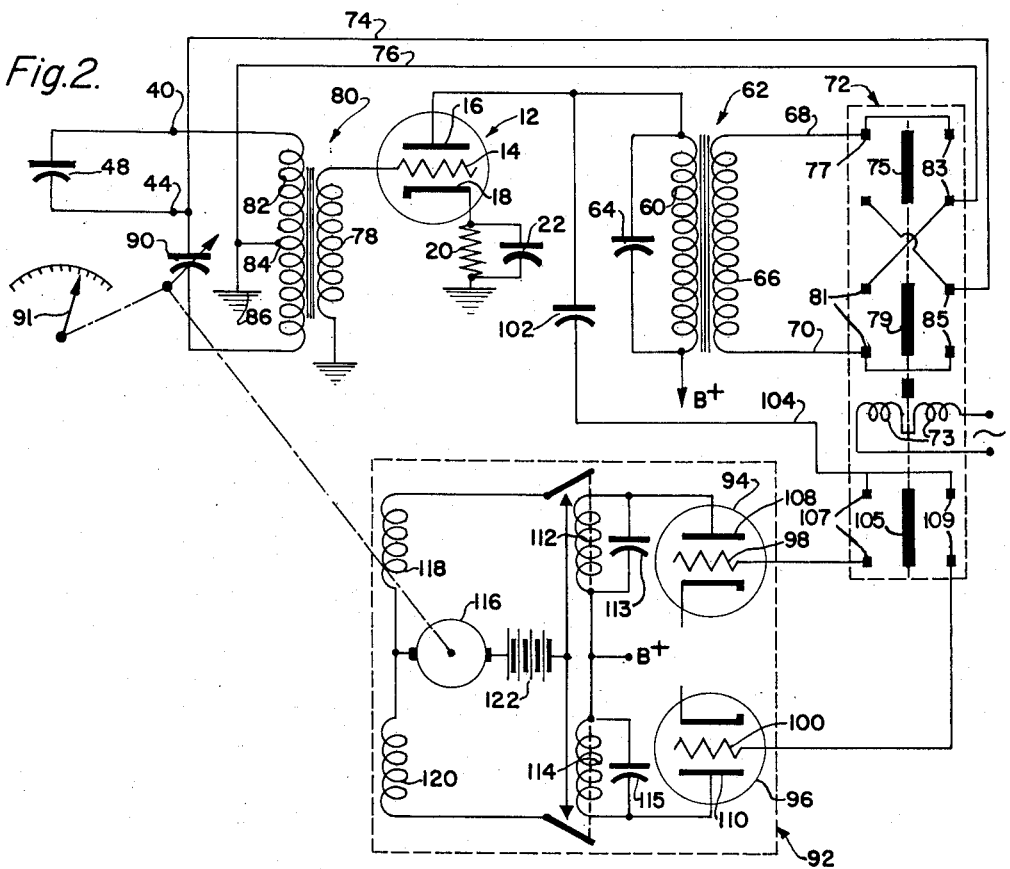
FIG. 2 is a circuit diagram of an alternate embodiment of the invention also shown as automatically measuring capacitance.

However, it may be more desirable to provide automatic switching and a servoed instrument which will automatically change the value of the variable capacitor 50 until it matches that of capacitor 48, and a circuit for such a device is disclosed in FIG. 2. In this figure the electron tube 12 is shown having its output anode 16 connected with one end of the primary winding 60 of the transformer 62, the other end of which is arranged for connection to the anode supply source shown as B+. A capacitor 64 coupled across the primary 60 forms therewith a tuned circuit, such as is obtained in the anode circuit of the embodiment shown in FIG. 1. The transformer secondary winding 66 is provided with leads 68 and 70 arranged for alternate feedback connection, by means of the vibrator switch means 72, with a pair of conductors 74 and 76 such that during substantially one-half vibrator cycle the lead 68 will be connected through the vibrator contacts with conductor 74 and lead 70 with conductor 76. During the ensuing half cycle, lead 68 will be connected through the vibrator contacts with conductor 76 and lead 70 with conductor 74, all as will be understood by those skilled in the art.

Thus, the vibrating contact 75 will connect the conductors 68 and 74 through vibrator stationary contacts 77 and vibrating contact 79 will connect conductors 70 and 76 through stationary contacts 81 during a first half of a vibration switching period, whereas contact 75 will connect the conductors 68 and 76 through vibrator stationary contacts 83 and contact 79 will connect conductors 70 and 74 through vibrator contacts 85 during the second half of the vibration switching period (moving contact transit time being disregarded). By this means the vibrator switch provides automatic means for feedback switching as mentioned hereinabove. It will be observed that the vibrator 72 is provided with field coils 73 connected to an alternating current source for its vibratory action. As will be obvious, many other conventional switch means may be employed in place of the particular vibrator means disclosed herein.

The input to the grid 14 of the electron tube 12 is provided by the secondary winding 78 of a transformer 80 having a center tapped primary winding 82, the center tap 84 being connected to the conductor 76 and grounded, as at 86. The terminal connections of the primary winding 82 are coupled to the capacitor 48, which is of unknown impedance, and to the variable capacitor 90. The other terminals of the capacitors 48 and 90 are joined together and connected to the conductor 74 at the terminal 44.

As thus far described, the embodiment of FIG. 2 is substantially the equivalent of that of FIG. 1 with the addition of the feedback switching vibrator means. The variable capacitor 90 is coupled to a dial pointer 91 which is arranged to give a reading in microfarads, or micromicrofarads as the case may be, according to the position of the capacitor movable plates. Movement of the plates may be accomplished manually, but in the embodiment of FIG. 2 the capacitor 90 is varied by a servo 92.

The servo may be of any conventional type being shown here as comprising a pair of electron tubes 94 and 96 whose input grids 98 and 100 are connected through the coupling capacitor 102 to the anode 16 of the tube 12 by means of a conductor 104 and through contacts on the vibrator 72 whereby cyclic alternation of the vibrator armature alternately will first connect grid 98 through vibrating contact 105 and stationary contacts 107, and then grid 100, through vibrating contact 105 and stationary contacts 109, to the conductor 104. The output anodes 108 and 110 of the tubes 94 and 96 are connected to the anode voltage supply B+ through the field windings of the relays 112 and 114, respectively. Capacitors 113 and 115 are shunted across the windings of the relays 112 and 114, respectively.

The relays 112 and 114 are adapted to energize the motor 116 through either of its bi-directional fields 118 or 120, current being supplied thereto by means of the battery 122, for example. Thus, when the relay 112 is energized by the tube 94, the motor will rotate in one direction, and when the relay 114 is energized by the tube 96, the motor 116 will rotate in the opposite direction. The output of the motor is coupled with the variable capacitor 90 and hence with the indicating scale pointer 91.

By this arrangement, the servo 92 is enabled to drive the capacitor 90 in the proper direction to reduce the difference between its value and that of capacitor 48 to zero. The circuit operates as follows:

If the unknown capacitor 48 is larger in value than that of the variable capacitor 90, during one-half of the vibrator period the circuit is regenerative. During this particular half period the grid 98 of the tube 94, for example, will receive the regenerative signal from the tube 12 by way of coupling capacitor 102, conductor 104 and the closed contacts on the lower end of the vibrator switch 72. This tube 94 will conduct and actuate the relay 112 in its anode circuit to energize the motor in one direction. The circuit is so connected that the motor direction is to increase the value of capacitor 90 (i.e. to reduce the difference between its value and that of capacitor 48).

During the ensuing vibrator half period, the circuit is degenerative, and the signal applied to the grid 100 of the tube 96 will be ineffective to cause it to conduct hence its relay 114 remains open and no current flows in the other motor winding.

On the other hand, if the value of capacitor 48 is less than that of capacitor 90, during the same one-half vibrator cycle first mentioned above, the circuit is degenerative and the signal applied to the grid 98 of the tube 94 is ineffective to cause the tube 94 to conduct. During the ensuing half cycle the circuit will be regenerative and this signal applied to the grid 100 of tube 96 will cause it to conduct and close the relay 114, which drives the motor in the opposite direction to decrease the value of capacitor 90.

In either event, when the value of capacitor 90 equals that of capacitor 48, the grid of tube 12 is effectively grounded and all regenerative and degenerative operation ceases. Hence signal is removed from the grids of tubes 94 and 96 and both tubes will be non-conducting. Relays 112 and 114 will both be open thereafter and the motor 116 de-energized. At this point the value of capacitor 48 may be read by the pointer 91 or otherwise calculated from its position.

It is obvious, of course, that the regenerative and degenerative action of the circuit arises out of the combination of the switching (by the vibrator means 72) of the transformer secondary leads 68 and 70 with the grounded conductor 76 and the companion conductor 74. This switching, in combination with the unknown value relationship of the capacitors 48 and 90, determines whether the circuit is regenerative or degenerative during any particular half period of the vibrator switch.

By reference to FIG. 2 the foregoing remarks are more particularly clarified. Suppose, for example, the capacitor 48 has an unknown capacitance which is larger than that of capacitor 90 at its then existing value and further suppose the vibrator contacts 75, 79 and 105, respectively move to the left (under the influence of vibrator coil 73) to make the following connections:

Conductor 68 with conductor 74.
Conductor 70 with conductor 76.
Conductor 104 with grid 98.

Figure 5:
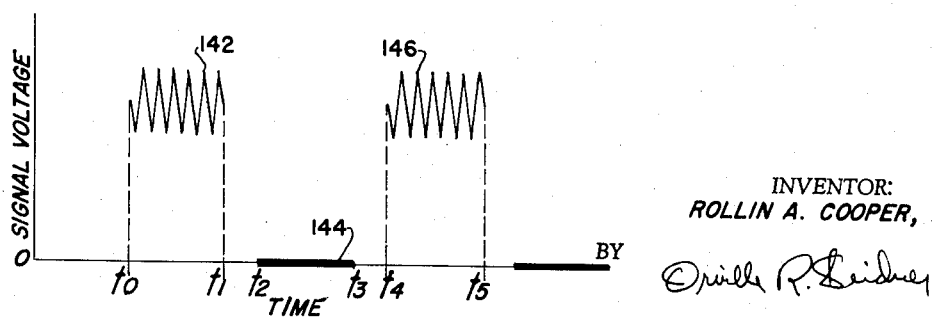
FIG. 5 is a graph showing representative signals at the input to the servo circuit portions of FIGS. 2 and 3 under one condition of unbalance.

It is still further supposed that the particular connections of conductors 68 with 74 and 70 with 76 results in circuit oscillation, and that the instant of time the connections made aforesaid is at $t_0$ on FIG. 5 to which reference is now made.

A burst of oscillations, shown at 142, will be impressed through the capacitor 102, conductor 104, and vibrator contacts 105 and 107 on the grid 98 of tube 94. So long as this oscillation signal exists the servo 92 will be activated by its tube 94 to increase the capacitance of capacitor 90 through the servomotor 116.

At time $t_1$ the connections are broken by movement of contacts 75, 79 and 105 away from contacts 77, 81 and 107, respectively. At the instant of breaking of the contacts the burst of oscillations ceases and the servo 92 is inactivated. The movable contacts 75, 79 and 105 then transit to the right and at time $t_2$ make contact with contacts 83, 85 and 109, respectively. The transit of the movable contacts thus consumes the elapsed time from $t_1$ to $t_2$.

When contacts 75 and 79 close with fixed contacts 83 and 85 respectively, the circuit will not oscillate since the reversal of the connections as between conductors 68, 70 and 74, 76 results in 100% degeneration, hence no oscillatory signal is impressed through the capacitor 102, conductor 104 and contacts 105 and 109 on the grid 100 of tube 96. This zero signal condition is represented at 144 in FIG. 5 and will exist so long as contacts 75, 79 and 105 make with fixed contacts 83, 85 and 109, respectively, from time $t_2$ to $t_3$.

As the movable contacts 75, 79 and 105 begin to move to the left under the influence of the vibrator coil 73, they will break with contacts 83, 85 and 109 at time $t_3$ and will transit to the left in the interval $t_3$ to $t_4$ at which latter time they will again make with contacts 77, 81 and 107, respectively to initiate another cycle. Thus one period of vibration of the movable contacts exists between times $t_0$ and $t_4$, at which latter time a new burst of oscillation is initiated as shown at 146.

If, on the other hand, we suppose the unknown capacitor 48 to have an unknown capacitance which is less than that of capacitor 90 at its then existing value, then the grid 100 of tube 96 will be triggered with the oscillation bursts to activate the servo 92 in such manner as to energize the motor 116 in the opposite direction and thus decrease the capacitance of capacitor 90. It is apparent, of course, that no matter which way the unbalance exists as between the capacitances of capacitors 48 and 90, when the servomotor 116 drives the capacitor 90 to equality with capacitor 48 the oscillator circuit is 100% degenerated and no further oscillation burst signals will appear at either of the grids 98 and 100 and the servomotor will be deactivated at that time.

It should now be apparent to those skilled in the electrical art that measurements of inductance or resistance may be made in accordance with the foregoing description, as well as the measurement of capacitance. For example, a variable mutual inductance coil or inductor of known value of inductance at various settings could be substituted for the known variable capacitor 90 of FIG. 2, and the value of inductance of an unknown inductance coil or inductor (substituted for the unknown capacitor 48) would be read on a suitable scale in connection with the pointer 91 coupled to the known variable as aforesaid. Likewise, known and unknown resistors could be substituted for the known and unknown capacitors 90 and 48, and with the circuit operating as aforesaid, the known resistor substituted for the known capacitor 90 would be varied by the motor 116 until the voltage at terminal 44 (as fed back by the conductors 74, 76) becomes zero with respect to ground at which time the circuit would be in balance and the value of the unknown resistance could be read by the pointer 91 on an appropriate scale.

Figure 3:
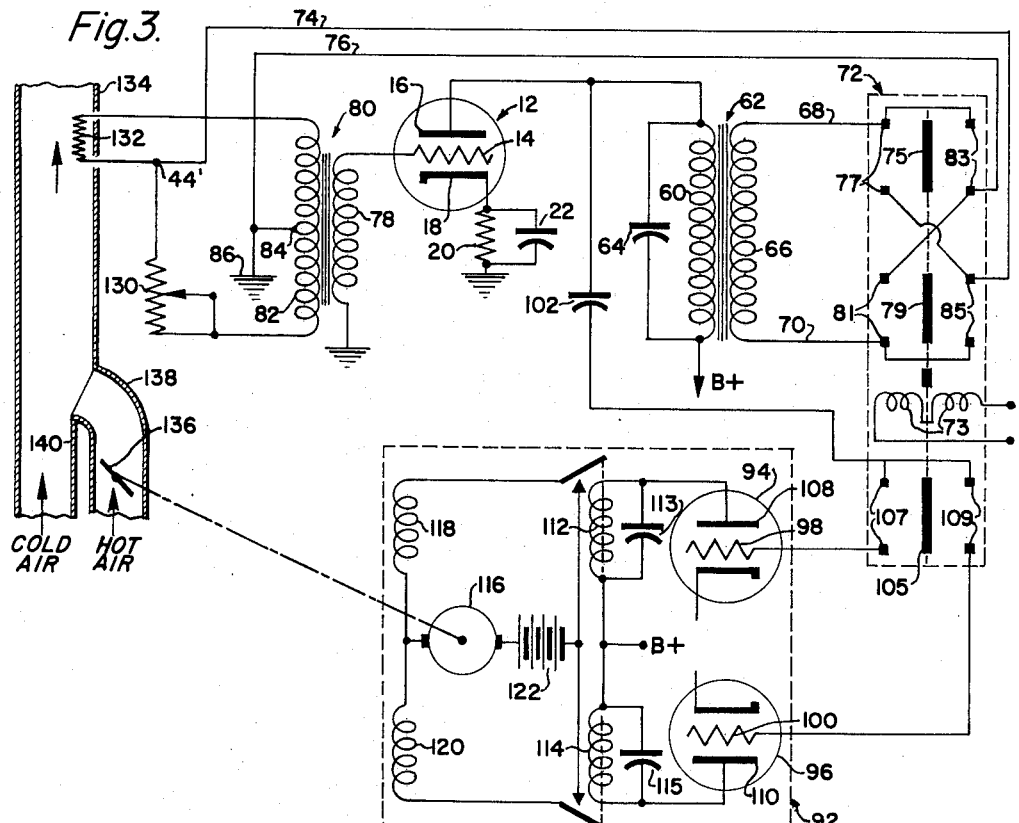
FIG. 3 is a circuit diagram of the invention adapted to control of a process variable.

In connection with the latter mentioned embodiment it is also apparent that the novel circuit of this invention is convenient and appropriate as a controller for a process variable. An example of such an embodiment of the invention is illustrated in FIG. 3 in which the center-tapped primary 82 of the transformer 80 has its end terminals coupled to the series connected resistors 130 and 132. The resistor 130 is of the usual potentiometer type while resistor 132, which is used for sensing the temperature in the duct 134 is preferably a thermistor whose resistance varies with its temperature. Potentiometer resistor 130 may be used for manual selection of the temperature desired in the duct 134. In the event that temperature selection is to be fixed it will be understood that variable resistor 130 may be replaced by one of the fixed variety.

The servo 92 and the circuit coupled to the secondary 78 of the transformer 80, and likewise coupled to the conductors 74 and 76 would be substantially the same as that shown in FIG. 2 and the description thereof need not be repeated. In this instance, the servo 92 is employed to operate a valve 136 in a hot air supply duct 138 to modulate the temperature of the air supplied by a cold air duct 140 to the duct 134.

The operation of the circuit of FIG. 3 is as follows: when the resistances of the resistors 130 and 132 are equal, the terminal 44' is substantially at ground potential and the amplifier circuit coupled to the secondary winding 78 will be inactive. Upon departure of the resistance of either of the resistors 130 or 132, the circuit of the primary winding 82 will become unbalanced and the amplifier will be energized to activate the servo 92 and to energize the conductors 74, 76 through the vibrator or switch means—all in the same manner as described above in connection with FIG. 2.

If, for example, the temperature in the duct 134 increases for any reason, the resistance of resistor 132 will increase and the amplifier connected to the secondary winding 78 will be caused to amplify an alternately regenerated and degenerated signal, by way of the tuned tank in the anode circuit, the regeneration and degeneration arising out of the action of the vibrator switch in co-operation with the conductors 74 and 76. At the same time, the servo 92 will be energized and cause the valve 136 to be moved towards a closed position. If, on the other hand, the temperature in the duct 134 decreases, the amplifier causes an alternately degenerated and regenerated signal to be generated, and the servo will move the valve towards a more open position. In either event, the potential at terminal 44' will decrease to that of the ground reference as the resistance of the resistor 132 approaches equality with that of resistor 130 by the action of the cooler or warmer air on it, as the case may be. When the voltage at the terminal 44' becomes zero, the servo 92 is de-energized.

The circuit of the embodiment of FIG. 3 is particularly attractive for applications where the temperature sensing resistor 132 is very small and thus subject to local heating and consequent change of value by any current flowing in it from the bridge circuit.

The invention having been described in several embodiments, it will now be apparent to those skilled in the art that various modifications could be made to achieve the same circuit function, namely, a balanced condition with zero potential voltage applied at the input. It is contemplated that all such variations are within the spirit and intent of the invention as defined by the subjoined claims.

I claim:
1. An electronic circuit including an excitable electron device having input and output electrodes comprising: first circuit means including a pair of series connected impedance elements coupled with said input electrode; second tuned circuit means including a pair of conductors coupling said output electrode with said series connected impedance elements and with said input electrode, said conductors being coupled to said output electrode 180° out of phase with each other; first means for switching the coupling of said conductors with said first circuit means and said input electrode; servo means for effectively varying one of said impedance elements, said servo means having a pair of directional sense inputs coupled with said output electrode; and second means for switching said directional sense inputs of said servo means with said output electrode simultaneously with said first switching means, said servo means operating to reduce to zero the feedback from said output electrode through said second circuit means whereby the signal excitation at said input electrode is reduced to substantially zero.

2. An electronic bridge effectively nonconductive in the balanced state comprising:
 a self-excitable source of oscillatory signal having an input circuit and an output circuit;
 a first feedback channel coupled to the output circuit, and including means for producing a regenerative feedback signal to self-excite the source of oscillatory signal;
 a second feedback channel coupled to the output circuit, and including means for producing a degenerative feedback signal;
 and means including an indicator coupled between one of the first and second feedback channels and a circuit point common to the input circuit and the other of the feedback channels for adjusting the impedance of one of the feedback channels relative to the impedance of the other in order to achieve effective concellation of the regenerative signal by the degenerative signal.

3. An electronic bridge effectively nonconductive in the balanced state comprising:
 a self-excitable source of oscillatory signal having an input circuit and an output circuit;
 a feedback network including a variable impedance coupled between the output and input circuits, means for coupling an unknown impedance in parallel with the variable impedance, and means coupled to the variable impedance and to the unknown impedance coupling means for developing regenerative and degenerative feedback signals for application to the input circuit;

means coupled to the output circuit for utilizing an electrical signal developed at the latter, and distinguishably indicative of the bridge balanced and unbalanced states;

and means coupled to the variable impedance for indicating the magnitude of the unknown impedance when the former has been adjusted to balance the bridge.

4. An electronic bridge effectively nonconductive in the balanced state comprising:

a self-excitable source of oscillatory signal having an input circuit and an output circuit;

means coupled to the output circuit for splitting the output signal into two components of equal amplitude and opposite phase;

a first feedback channel including a variable impedance coupled to the input circuit, and a second feedback channel coupled to the input circuit and including means for coupling an unknown impedance in parallel with the variable impedance;

means coupled to the signal-splitting means and to the first and second channels for supplying a regenerative feedback signal to the input circuit via one of the first and second channels, and a degenerative feedback signal to the input circuit via the other channel, and vice versa;

and means coupled to the output circuit for utilizing an electrical signal developed at the latter, and distinguishably indicative of the bridge balanced and unbalanced states.

5. An electronic bridge effectively nonconductive in the balanced state comprising:

a self-excitable source of oscillatory signal having an input circuit and an output circuit;

means coupled to the output circuit for splitting the output signal into two components of equal amplitude and opposite phase;

a first feedback channel including a variable impedance coupled to the input circuit, and a second feedback channel coupled to the input circuit and including means for coupling an unknown impedance in parallel with the variable impedance;

means coupled to the signal splitting means and to the first and second channels for supplying a regenerative feedback signal to the input circuit via one of the first and second channels, and a degenerative-feedback signal to the input circuit via the other channel, and vice versa;

and further means coupled to the output circuit and to the variable-impedance for adjusting the latter automatically to produce a state of bridge balance in response to alternate oscillatory and steady-state signals developed at the output terminal as a result of operation of the feedback signal supplying means.

6. A method of measuring an unknown impedance element without subjecting the element to electrical current, and constituting a new use for a balanceable bridge circuit made up of an oscillator having an input circuit, an output circuit, regenerative and degenerative feedback channels coupled in parallel between the input and output circuits to form a two-arm bridge network, and means coupled to the output circuit for indicating whether the oscillator is oscillating, the new use for the balanceable bridge circuit comprising the steps of:

connecting an unknown impedance in conductive relation to one of the feedback channels, and a calibrated variable impedance in conductive relation to the other feedback channel;

and adjusting the latter impedance to balance the bridge, a condition signified by cessation of oscillation when the degenerative feedback signal cancels the regenerative feedback signal, and current flow through the unknown impedance terminates.

7. A method of measuring an unknown impedance element without subjecting the element to electrical current, and constituting a new use for a balanceable bridge circuit made up of an oscillator having an input circuit, an output circuit, regenerative and degenerative feedback channels coupled in parallel between the input and output circuits to form a two-arm bridge network, and means coupled to the output circuit for indicating whether the oscillator is oscillating, the new use for the balanceable bridge circuit comprising the steps of:

connecting an unknown impedance in conductive relation to one of the feedback channels, and a calibrated variable impedance in conductive relation to the other feedback channel;

adjusting the latter impedance until the indicator signifies that oscillation of the oscillator has ceased;

effectively exchanging the respective positions of the unknown and variable impedances of the feedback channels so that the regenerative signal, if any, will predominate over the degenerative signal and restore oscillation in the event that the respective impedances of the feedback channels were not effectively equalized by the adjustment of the variable impedance made in the last preceding step;

and when oscillation is restored by performing the last preceding step, repeating the last two preceding steps until the oscillator is quiescent notwithstanding an effective exchange of position of the unknown and variable impedances.

8. A method of measuring an unknown impedance without subjecting the later to electrical current, the method being comprised of the steps of:

coupling the unknown impedance in one and a calibrated, variable impedance in the other of paralleled first and second feedback channels coupled between the output and input circuits of a self-excitable oscillator for returning to the input circuit respective regenerative and degenerative feedback signals;

and adjusting the variable impedance until the regenerative and degenerative feedback signals mutually cancel at the input circuit, so that oscillation of the oscillator and current flow through the unknown impedance, at least, effectively cease.

9. A method for measuring an unknown impedance without subjecting the latter to electrical current, the method being comprised of the steps of:

coupling the unknown impedance in one and a calibrated, variable impedance in the other of paralleled first and second feedback channels coupled between the output and input circuits of a self-excitable oscillator for returning to the input circuit respective regenerative and degenerative feedback signals;

adjusting the variable impedance until oscillation ceases;

effectively exchanging the respective positions of the unknown and variable impedances in the feedback channels so that the regenerative signal, if any, will predominate over the degenerative signal and restore oscillation in the event that the respective impedances of the first and second feedback channels were not equalized by the adjustment of the variable impedance, and cessation of oscillation was the result of a predominating degenerative signal;

and, when oscillation is restored by performing the last preceding step, repeating the last two preceding steps until the oscillator is quiescent notwithstanding an effective exchange of position of the unknown and variable impedances.

10. A close-loop servo system comprising:

a first conductive element having an impedance controlled in response to an ambient condition;

a second conductive element having a desired reference impedance;

means for regulating the ambient condition;

means including a oscillator having a first feedback channel coupled in parallel to the first element and containing the second element, for producing a difference signal representing at least the existence and direction of a difference between the respective impedances of the first and second elements;

and means coupled to the first element, to producing means, and to the regulating means, and responsive to the difference signal for operating the latter means to control the ambient condition, and hence, the impedance of the first element.

11. A closed-loop servo system comprising:

a first conductive element having an impedance controllable in response to an ambient condition;

means regulating the ambient condition determinative impedance of the first element;

a servo motor coupled to the regulating means;

a second conductive element having a desired reference impedance;

means having an output terminal and an input terminal for controlling electrical power at the output terminal in response to minute electrical power, relative to the output power, applied to the input terminal;

means coupled to the input terminal including a tuned circuit, and the first and second elements coupled in parallel, for feeding back to the input terminal via one of the first and second elements a regenerative feedback signal normally causing oscillatory operation of the power controlling means, and via the other of the elements a degenerative feedback signal for cancelling at least a portion of the regenerative signal;

means coupled to the output terminal and the feedback means for exchanging alternately the respective conductive paths of the degenerative and regenerative feedback signals through the first and second elements to develop at the output terminal an oscillatory signal during a series of alternate half-cycles of the exchanging means determined by the relative unequal impedance magnitudes of the first and second elements;

and means coupled to the output terminal and the servo motor, and including means functioning in synchronism with the exchanging means, for applying electrical power to the servo motor in the direction required for the latter to operate the regulating means to control the first element until effective mutual cancellation of the regenerative and degenerative feedback signals occurs and oscillation ceases.

References Cited in the file of this patent

UNITED STATES PATENTS

| | | |
|---|---|---|
| 2,250,526 | Franke et al. | July 29, 1941 |
| 2,409,620 | Fritschi | Oct. 22, 1946 |

FOREIGN PATENTS

| | | |
|---|---|---|
| 349,496 | Great Britain | May 22, 1931 |

OTHER REFERENCES

Vacuum Tube Oscillators, Edson, W. A., John Wiley & Sons, New York 1953, page 70.